US012568553B2

(12) United States Patent
Behura et al.

(10) Patent No.: US 12,568,553 B2
(45) Date of Patent: Mar. 3, 2026

(54) CONFIGURING SKIPPING OF PAGING EARLY INDICATION IN WIRELESS COMMUNICATIONS

(71) Applicant: QUALCOMM Incorporated, San Diego, CA (US)

(72) Inventors: Sambit Behura, Telangana (IN); Ishdeep Singh Juneja, Telangana (IN); Varun Walia, Telangana (IN); Muhammad Nazmul Islam, Littleton, MA (US); Huilin Xu, Temecula, CA (US)

( * ) Notice: Subject to any disclaimer, the term of this patent is extended or adjusted under 35 U.S.C. 154(b) by 360 days.

(21) Appl. No.: 18/469,224

(22) Filed: Sep. 18, 2023

(65) Prior Publication Data

US 2025/0098022 A1 Mar. 20, 2025

(51) Int. Cl.
| | |
|---|---|
| *H04W 76/28* | (2018.01) |
| *H04W 68/02* | (2009.01) |
| *H04W 72/232* | (2023.01) |

(52) U.S. Cl.
CPC ........... *H04W 76/28* (2018.02); *H04W 68/02* (2013.01); *H04W 72/232* (2023.01)

(58) Field of Classification Search
CPC ... H04W 76/28; H04W 68/02; H04W 72/232; H04W 52/0216; H04W 52/0229; Y02D 30/70
See application file for complete search history.

(56) References Cited

U.S. PATENT DOCUMENTS

| | | | | |
|---|---|---|---|---|
| 11,627,552 B1* | 4/2023 | Kaikkonen | ......... | H04W 68/025 |
| | | | | 455/458 |
| 2022/0232514 A1* | 7/2022 | Tseng | ..................... | H04W 60/00 |
| 2022/0312369 A1* | 9/2022 | He | ......................... | H04W 68/02 |
| 2023/0108646 A1* | 4/2023 | Tseng | .................. | H04W 68/025 |
| | | | | 455/458 |
| 2023/0397115 A1* | 12/2023 | Maleki | .............. | H04W 52/0235 |
| 2025/0142470 A1* | 5/2025 | Nader | .............. | H04W 52/0216 |

* cited by examiner

*Primary Examiner* — Afshawn M Towfighi

(57) ABSTRACT

Aspects described herein relate to configuring a device to skip multiple paging early indication (PEI) occasions. An indication of a skip duration of multiple discontinuous receive (DRX) cycles to skip in monitoring for a paging early indication (PEI) can be received, and a reduced power state can be entered for the skip duration. After the skip duration, an increased power state can be entered to monitor for the PEI, a synchronization signal block (SSB), or one or more reference signals.

30 Claims, 9 Drawing Sheets

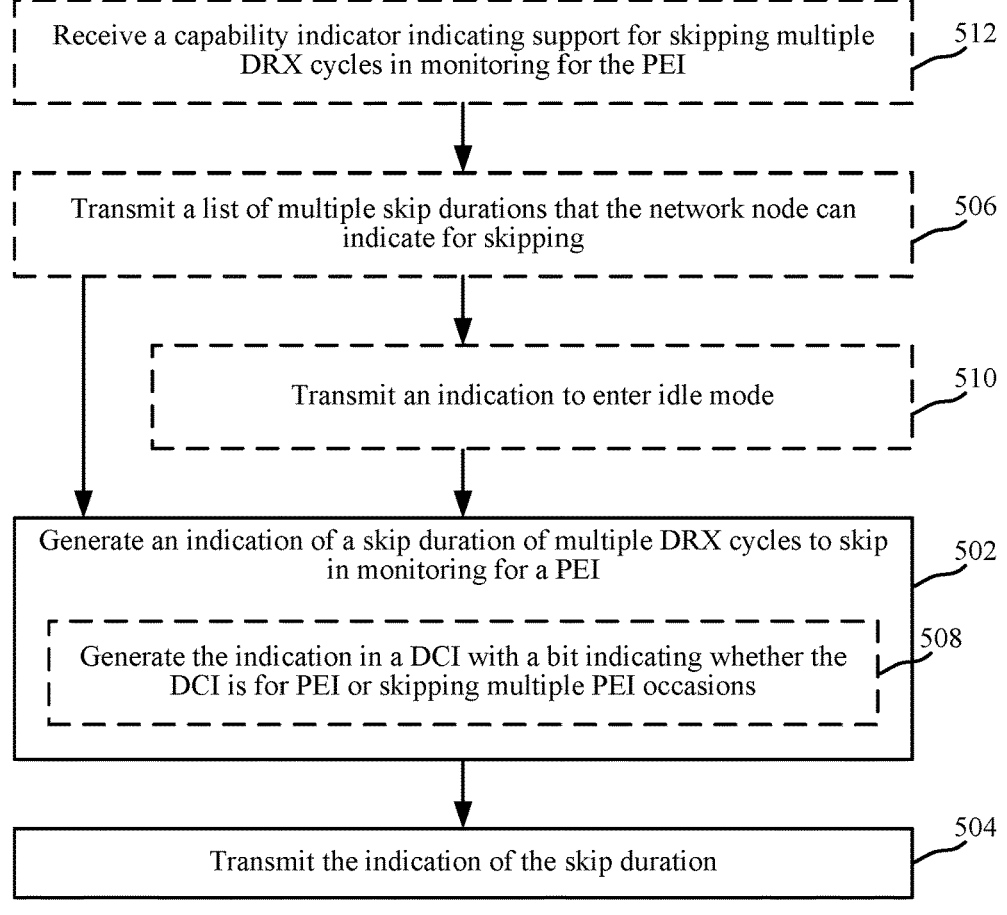

500

Receive a capability indicator indicating support for skipping multiple DRX cycles in monitoring for the PEI — 512

Transmit a list of multiple skip durations that the network node can indicate for skipping — 506

Transmit an indication to enter idle mode — 510

Generate an indication of a skip duration of multiple DRX cycles to skip in monitoring for a PEI — 502

Generate the indication in a DCI with a bit indicating whether the DCI is for PEI or skipping multiple PEI occasions — 508

Transmit the indication of the skip duration — 504

FIG. 5

CONFIGURING SKIPPING OF PAGING EARLY INDICATION IN WIRELESS COMMUNICATIONS

FIELD OF THE DISCLOSURE

Aspects of the present disclosure relate generally to wireless communication systems, and more particularly, to paging early indication (PEI) occasions.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, one or more memories configured to, individually or in combination, store instructions, and one or more processors communicatively coupled with the one or more memories. The one or more processors are, individually or in combination, configured to execute the instructions to cause the apparatus to receive, from a network node, an indication of a skip duration of multiple discontinuous receive (DRX) cycles to skip in monitoring for a paging early indication (PEI), enter a reduced power state for the skip duration, and enter an increased power state after the skip duration to monitor for the PEI, a synchronization signal block (SSB), or one or more reference signals.

In another aspect, an apparatus for wireless communication is provided that includes a transceiver, one or more memories configured to, individually or in combination, store instructions, and one or more processors communicatively coupled with the one or more memories. The one or more processors are, individually or in combination, configured to execute the instructions to cause the apparatus to generate, for a user equipment (UE), an indication of a skip duration of multiple DRX cycles to skip in monitoring for a PEI signal, and transmit, for the UE, the indication of the skip duration.

In another aspect, a method for wireless communication at a UE is provided that includes receiving, from a network node, an indication of a skip duration of multiple DRX cycles to skip in monitoring for a PEI, entering, at the UE, a reduced power state for the skip duration, and entering, at the UE, an increased power state after the skip duration to monitor for the PEI, a SSB, or one or more reference signals.

In another aspect, a method for wireless communication at a network node is provided that includes generating, for a UE, an indication of a skip duration of multiple DRX cycles to skip in monitoring for a PEI signal, and transmitting, for the UE, the indication of the skip duration.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 5 is a flow chart illustrating an example of a method for configuring a device to skip one or more paging early indication (PEI) occasions (PEIOs), in accordance with aspects described herein;

DETAILED DESCRIPTION

Figure 1:
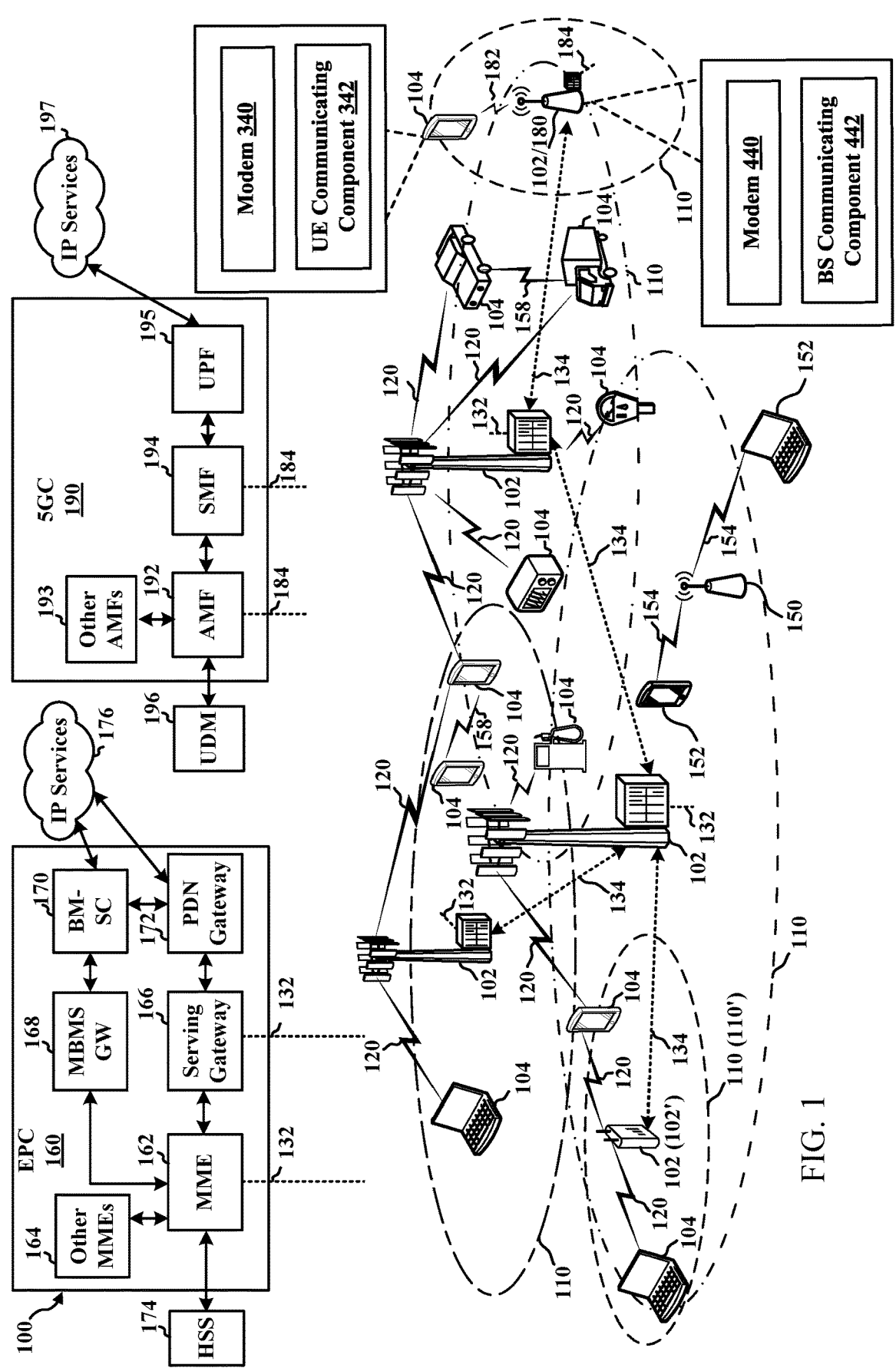
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to configuring devices in wireless communications to skip multiple paging early indication (PEI) occasions (PEIOs) to facilitate operating in a reduced power state for a period of time that can span the multiple PEIOs. For example, in some wireless communication technologies, such as fifth generation (5G) new radio (NR), a device can support PEI, which allows the device to operate in a reduced power state while increasing to a normal power (or increased power) state during certain time intervals to receive a PEI. If the device receives a PEI, the device can transition from the reduced power state to the normal power (or increased power) state in a subsequent time interval, e.g., a paging occasion, to possibly receive a paging message. If the device does not receive the PEI, the device can remain in, or return to, the reduced power state until a next PEIO. This can conserve power in the devices by not requiring the devices to operate in a normal power state at all times. Operating in the reduced power state can include the device reducing or terminating power to one or more radio frequency (RF) components, reducing processing power in one or more processors of the device, and/or the like, during the associated time interval.

Specifically, in 5G NR, a reduced capability (RedCap) user equipment (UE) supporting PEI can monitor one PEIO per discontinuous receive (DRX) cycle to receive the PEI. For example, the PEI can be indicated in a downlink control information (DCI) payload (e.g., DCI format 2_7) that can indicate whether the UE, or a subgroup of UEs assigned a subgroup_ID, is to monitor its associated paging occasion (PO). For example, UEs can be grouped in a subgroup, where the subgroup of UEs are associated with a subgroup_ID, and the UE can receive signaling intended for the subgroup (e.g., configuration signaling, such as the PEI indication in DCI format 2_7) based on the subgroup_ID. In addition, a DRX cycle can be defined as a period of time during which the UE can be configured to operate in either the reduced power state (e.g., during which communications are not received by the UE) or the normal or increased power state (e.g., during which communications can be received by the UE). In the reduced power state, the UE can terminate or at least reduce power to the RF components operable for receiving the wireless communications (referred to as DRX OFF), and in the normal or increased power state, the UE can activate power to the RF components (referred to as DRX ON). In one example, a DRX cycle can be defined by one DRX OFF period and one subsequent DRX ON period, though other configurations may be possible.

In 5G NR, the UE can also track synchronization signal blocks (SSBs) or other reference signals (RSs) during the DRX cycle regardless of whether (or not) the PEI indicates to monitor for a paging message. Thus, in some examples, the UE can operate in the normal or increased power state to track SSBs or other RSs even when the PEI indicates that no paging message is to be monitored by the UE in the current PEIO.

A PEIO can be a set of S*X consecutive PDCCH monitoring occasions, where S is the number of actual transmitted SSBs, which can be determined according to one or more parameters received in radio resource control (RRC) signaling by a network node (e.g., in ssb-PositionsInBurst in system information block (SIB) 1), and X is the nrofPDCCHMonitoringOccasionPerSSB-InPO, which can also be received in the RRC signaling (if configured) or is equal to 1 otherwise. The UE and/or network node can determine PDCCH monitoring occasions for PEI according to one or more parameters, which may be configured using RRC signaling, such as pei-SearchSpace, PEI-F_offset, firstPDCCH-MonitoringOccasionOfPEI-O, nrofPDCCH-MonitoringOccasionPerSSB-InPO (if configured). For example, pei-SearchSpace, PEI-F_offset, firstPDCCH-MonitoringOccasionOfPEI-O, nrofPDCCH-MonitoringOccasionPerSSB-InPO can be information elements defined in 5G NR for configuring for a UE using RRC signaling. As defined in 5G NR, pei-SearchSpace can be an identifier of dedicated search space (SS) for PEI. It can be configured to one of up to 4 common SS sets configured by common-SearchSpaceList with SearchSpaceId>0. The control channel element (CCE) aggregation levels and maximum number of physical downlink control channel (PDCCH) candidates per CCE aggregation level can be defined in 5G NR as well (e.g., in third generation partnership project (3GPP) technical specification (TS) 38.213, Table 10.1-1). SearchSpaceId=0 can be configured for the case of SS/physical broadcast channel (PBCH) block and control resource set (CORESET) multiplexing pattern 2 or 3. PEI-F_offset can correspond to pei-FrameOffset in 5G NR, which can represent an offset, in number of frames, from the start of a reference frame for PEI-O to the start of a first paging frame of the paging frames associated with the PEI-O, as defined in 3GPP TS 38.213, clause 10.4A. firstPDCCH-MonitoringOccasionOfPEI-O can represent an offset, in number of symbols, from the start of the reference frame for PEI-O to the start of the first PDCCH monitoring occasion of PEI-O on this bandwidth part (BWP), as defined in 3GPP TS 38.213, clause 10.4A. For the case po-NumPerPEI is smaller than Ns, UE can apply the (floor (i_s/po-NumPerPEI)+1)-th value out of (N_s/po-NumPerPEI) configured values in firstPDCCH-MonitoringOccasionOfPEI-O for the symbol-level offset. When po-NumPerPEI is one or multiple of Ns, UE can apply the first configured value in firstPDCCHMonitoringOccasionOfPEI-O for the symbol-level offset. nrofPDCCH-MonitoringOccasionPerSSB-InPO can represent the number of PDCCH monitoring occasions corresponding to an SSB within a Paging Occasion, as defined in 3GPP TS 38.304, clause 7.1.

When the UE detects a PEI within its PEIO, the UE may not be required to monitor the subsequent monitoring occasion(s) associated with the same PEIO. If the UE detects PEI and the PEI indicates the subgroup the UE belongs to monitor its associated PO, the UE can monitor the associated PO. If the UE does not detect PEI on the monitored PEIO or the PEI does not indicate the subgroup the UE belongs to monitor its associated PO, the UE may not be required to monitor the associated PO, and can remain in a reduced power state during the PO. As described, DCI format 2_7 can be used for PEI indication and can have a max size (e.g., payloadSizeDCI2-7) of 41 bits for licensed spectrum communications, or 43 bits for unlicensed spectrum communications. An example of DCI format 2_7 is shown below, where M can represent a number of paging occasions (which can be 1, 2, 4, or 8 in one example), and L can represent a number of UE subgroups (which can be less than or equal to 8 in one example), such that each UE subgroup has a bit for indicating the PEI for the UE subgroup for a given PO:

| PO-1 | Subgroup ID 0 | L Bits | payloadSizeDCI2-7 bits |
| | . . . | | |
| | Subgroup ID L - 1 | | |
| PO-2 | Subgroup ID 0 | L Bits | |
| | . . . | | |
| | Subgroup ID L - 1 | | |
| . . . | Subgroup ID 0 | L Bits | |
| | . . . | | |
| | Subgroup ID L - 1 | | |
| PO-M | Subgroup ID 0 | L Bits | |
| | . . . | | |
| | Subgroup ID L - 1 | | |
| TRS Availability Indication Reserved | | 0-6 Bits | |

In addition, in 5G NR, if PEI and subgrouping are configured, UEs monitoring the same PO can be divided into one or more subgroups. With subgrouping, the UE monitors PO if the corresponding bit for subgroup the UE belongs to is indicated as 1 by PEI corresponding to its PO. UE's subgroup can be either assigned by network node or formed by the network node or UE based on a UE identifier. A UE supporting network node assigned subgrouping in RRC_IDLE or RRC_INACTIVE state can be assigned a subgroup ID (e.g., between 0 to 7), which can be assigned by an access and mobility function (AMF) through non-access stratum (NAS) signaling via REGISTRATION ACCEPT or CONFIGURATION UPDATE COMMAND, as defined in 5G NR.

In some cases, a UE may further benefit from sleeping for more than one PEIO, such as when the paging hit percentage for a given subgroup is low across a number of POs in a certain time period (and/or when there is no additional paging awaiting for the UE in the downlink). Accordingly, aspects described herein relate to configuring a device (e.g., UE) to skip multiple PEIOs, allowing the devices to remain in reduced power state for longer periods of time. For example, the device can also skip tracking SSBs or RSs during the configured period of time. This can reduce power consumption, and conserve energy, battery life, etc., for the device without necessarily compromising paging of the device to increase power and receive a paging message during a PO.

The described features will be presented in more detail below with reference to FIGS. 1-9.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for skipping one or more PEIOs, in accordance with aspects described herein. In addition, some nodes may have a modem 440 and BS communicating component 442 for configuring a UE to skip one or more PEIOs, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, BS communicating component 442 can configure a UE 104 for skipping (e.g., allowing the UE 104 to remain in a reduced power state during) one or more PEIOs, which may also include skipping SSB or RS tracking during the one or more PEIOs. In an example, UE communicating component 342 can skip one or more PEIOs, and/or skip SSB or RS tracking during the one or more PEIOs, which may be based on a configuration received from a base station 102.

Figure 2:
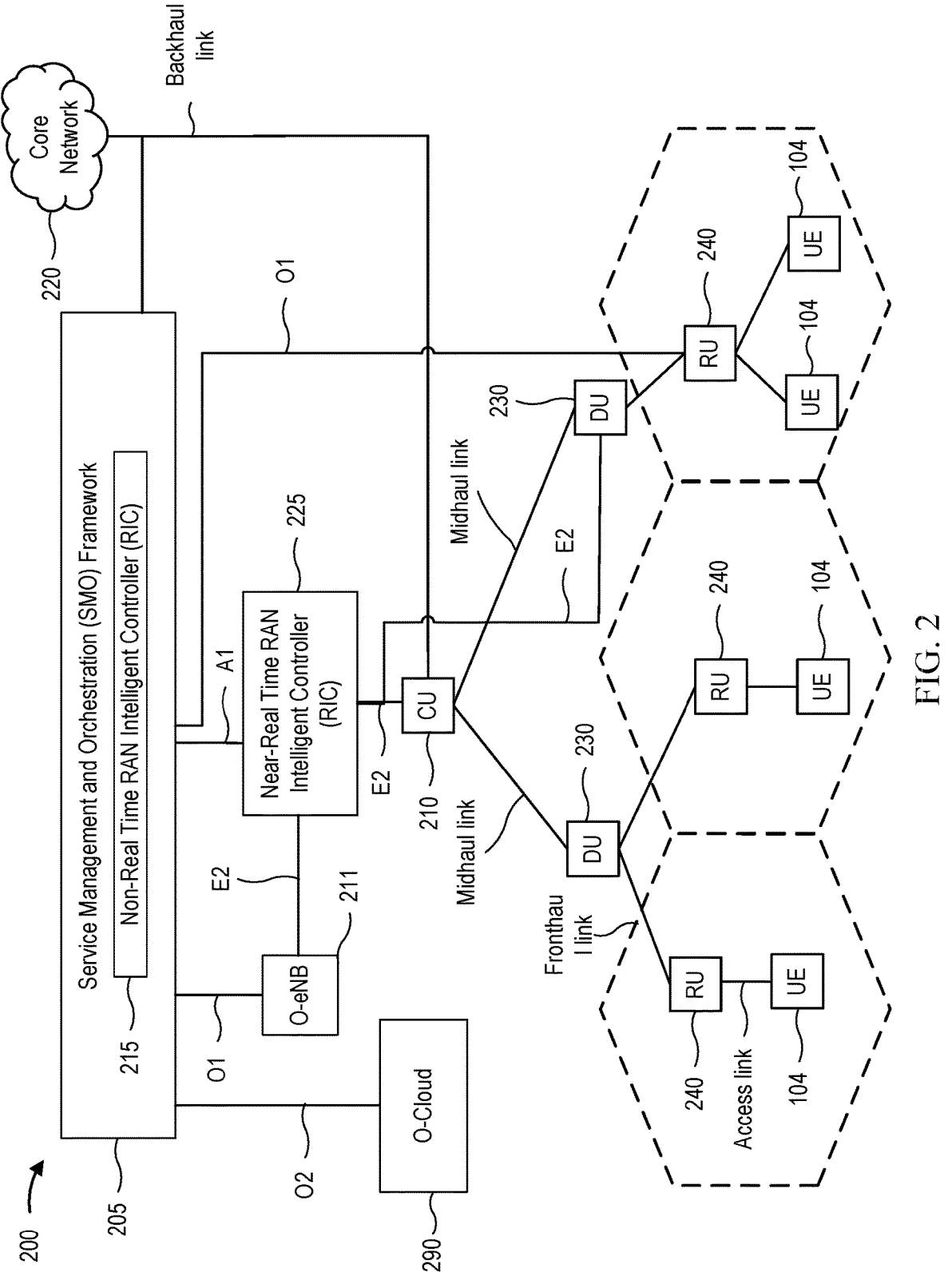
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 6:
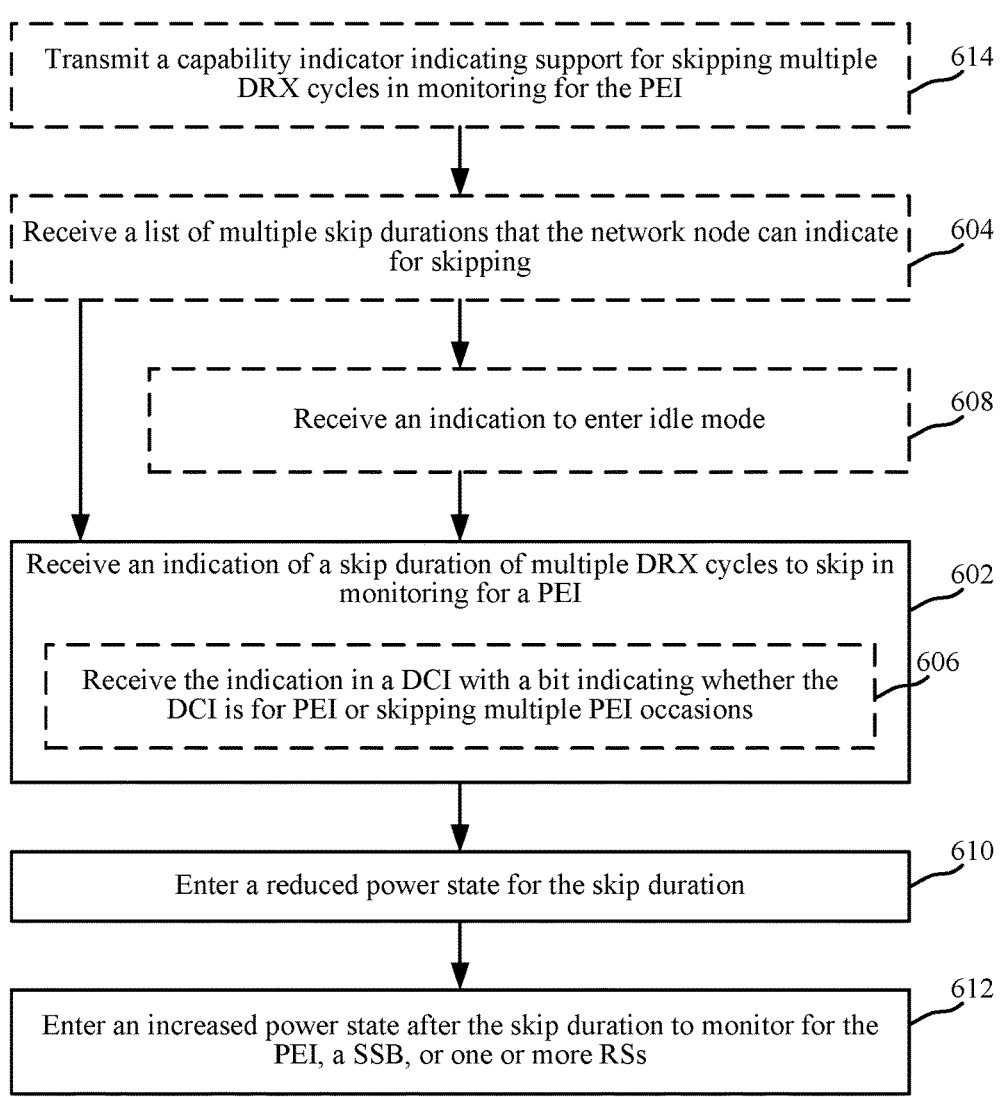
FIG. 6 is a flow chart illustrating an example of a method for skipping one or more PEIOs, in accordance with aspects described herein.

Turning now to FIGS. 3-9, aspects are depicted with reference to one or more components and one or more methods that may perform the actions or operations described herein, where aspects in dashed line may be optional. Although the operations described below in FIGS. 5 and 6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 3:
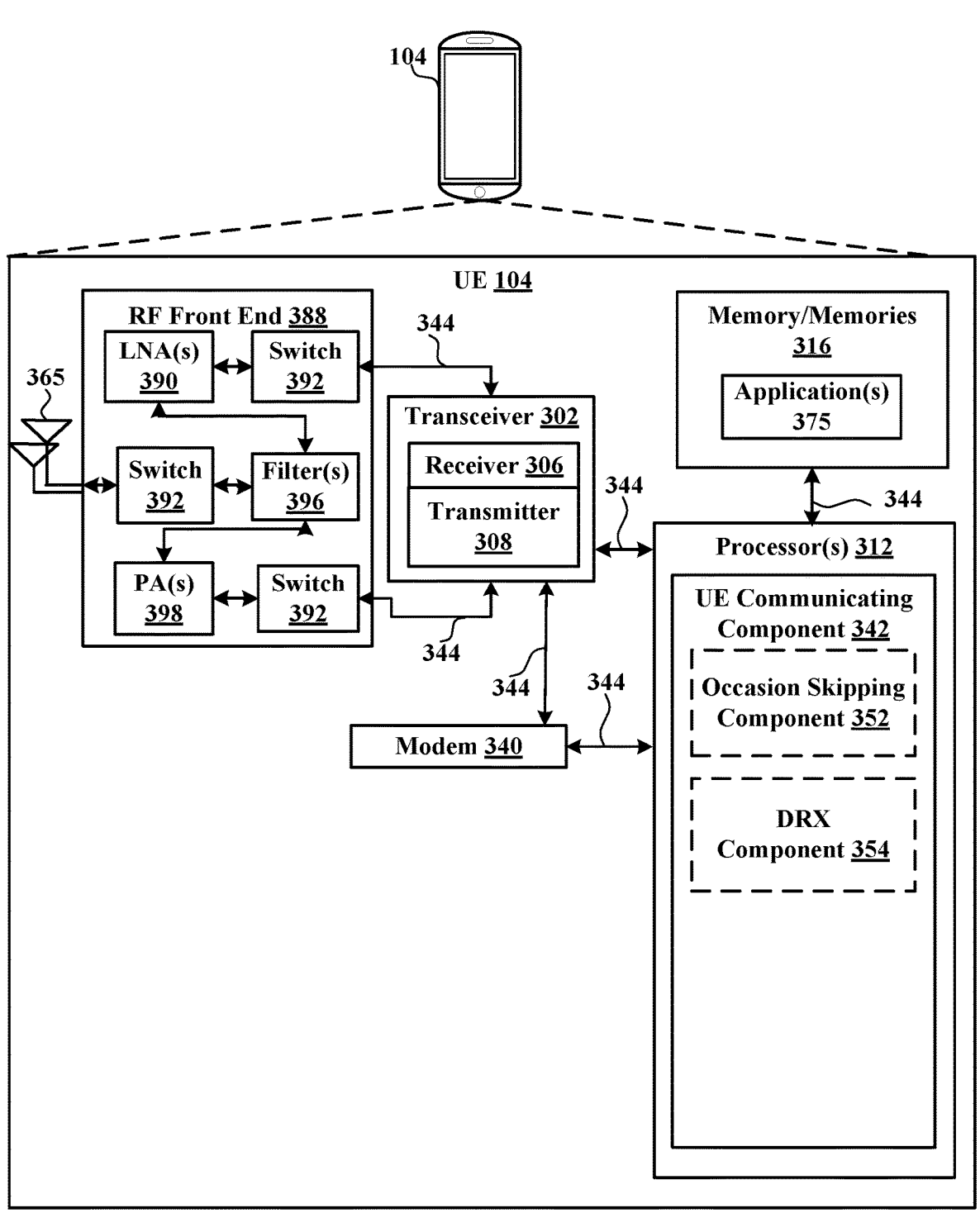
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and one or more memories 316 and one or more transceivers 302 in communication via one or more buses 344. For example, the one or more processors 312 can include a single processor or multiple processors configured to perform one or more functions described herein. For example, the multiple processors can be configured to perform a certain subset of a set of functions described herein, such that the multiple processors together can perform the set of functions. Similarly, for example, the one or more memories 316 can include a single memory device or multiple memory devices configured to store instructions or parameters for performing one or more functions described herein. For example, the multiple memory devices can be configured to store the instructions or parameters for performing a certain subset of a set of functions described herein, such that the multiple memory devices together can store the instructions or parameters for the set of functions. The one or more processors 312, one or more memories 316, and one or more transceivers 302 may operate in conjunction with modem 340 and/or UE communicating component 342 for skipping one or more PEIOs, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory/memories 316 may be configured to store data used herein and/or local versions of applications 375 or UE communicating component 342 and/or one or more of its subcomponents being executed by at least one processor 312. Memory/memories 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory/memories 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAS) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor(s) 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include an occasion skipping component 352 for skipping one or more PEIOs and/or tracking SSBs or RSs during the one or more PEIOs, and/or a DRX component 354 for operating according to a DRX cycle.

In an aspect, the processor(s) 312 may correspond to one or more of the processors described in connection with the UE in FIG. 9. Similarly, the memory/memories 316 may correspond to the memory/memories described in connection with the UE in FIG. 9.

Figure 4:
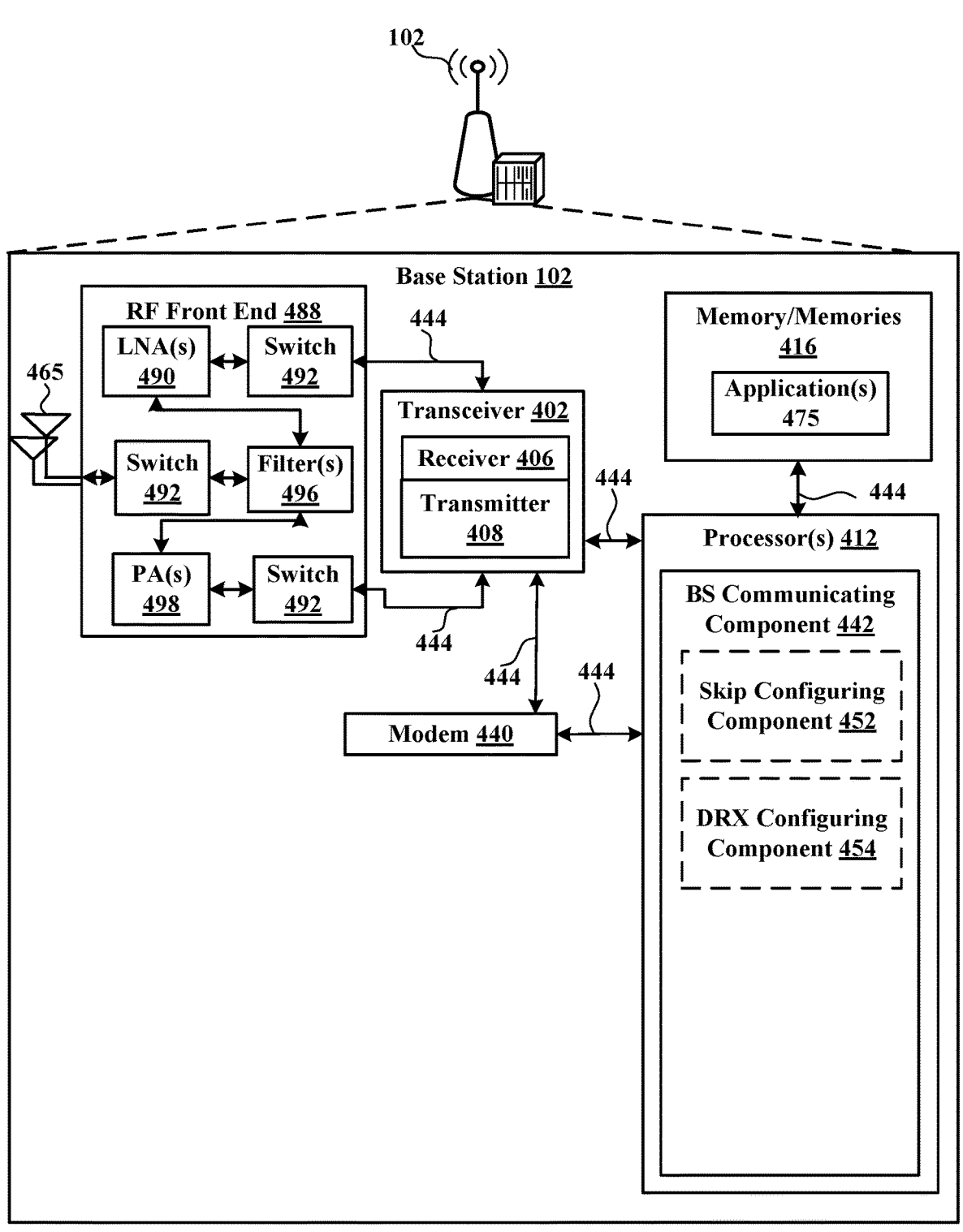
FIG. 4 is a block diagram illustrating an example of a base station, in accordance with various aspects of the present disclosure.

Referring to FIG. 4, one example of an implementation of base station 102 (e.g., a base station 102 and/or gNB 180, as described above) may include a variety of components, some of which have already been described above, but including components such as one or more processors 412 and one or more memories 416 and one or more transceivers 402 in communication via one or more buses 444. For example, the one or more processors 412 can include a single processor or multiple processors configured to perform one or more functions described herein. For example, the multiple processors can be configured to perform a certain subset of a set of functions described herein, such that the multiple processors together can perform the set of functions. Similarly, for example, the one or more memories 416 can include a single memory device or multiple memory devices configured to store instructions or parameters for performing one or more functions described herein. For example, the multiple memory devices can be configured to store the instructions or parameters for performing a certain subset of a set of functions described herein, such that the multiple memory devices together can store the instructions or parameters for the set of functions. The one or more processors 412, one or more memories 416, and one or more transceivers 402 may operate in conjunction with modem 440 and/or BS communicating component 442 for configuring a UE to skip one or more PEIOs, in accordance with aspects described herein.

The transceiver 402, receiver 406, transmitter 408, one or more processors 412, memory/memories 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include a skip configuring component 452 for configuring a device to skip multiple PEIOs, and/or a DRX configuring component 454 for configuring a DRX cycle for the device.

In an aspect, the processor(s) 412 may correspond to one or more of the processors described in connection with the base station in FIG. 9. Similarly, the memory/memories 416 may correspond to the memory/memories described in connection with the base station in FIG. 9.

FIG. 5 illustrates a flow chart of an example of a method 500 for configuring a device to skip one or more PEIOs, in accordance with aspects described herein. FIG. 6 illustrates a flow chart of an example of a method 600 for skipping one or more PEIOs, in accordance with aspects described herein. In an example, a network node (e.g., a base station 102 or gNB 180, a monolithic base station or gNB, a portion of a disaggregated base station or gNB, a gNB that controls multiple TRPs, a gNB that provides a single TRP, a RU that is one of multiple RUs sharing a single DU, etc.), a UE 104 in sidelink communications, etc. can perform the functions described in method 500 shown in FIG. 5 using one or more of the components described in FIGS. 1 and 4. In an example, a UE 104 or other device (e.g., an IoT device, etc.) can perform the functions described in method 600 shown in FIG. 6 using one or more of the components described in FIGS. 1 and 3. Methods 500 and 600 are described in conjunction with one another for ease of explanation; however, the methods 500 and 600 are not required to be performed together and indeed can be performed independently using separate devices.

In method 500, at Block 502, an indication of a skip duration of multiple DRX cycles to skip in monitoring for a PEI can be generated. In an aspect, skip configuring component 452, e.g., in conjunction with processor(s) 412, memory/memories 416, transceiver 402, BS communicating component 442, etc., can generate the indication of the skip duration of multiple DRX cycles to skip in monitoring for the PEI. For example, skip configuring component 452 can determine or otherwise configure the skip duration for a UE or a subgroup of UEs, which can be based on a paging hit percentage associated with the UE or subgroup of UEs, and/or other considerations, such as UE type (e.g., whether the UE is a RedCap UE), a determination that no paging is awaiting in the downlink for the UE or subgroup of UEs, a network capacity, etc. For example, this can allow network nodes to employ intelligence and perform network assigned paging for a subgroup of UEs based on paging hit percentage based on past data over a time period. For example, the network node can group UEs with paging hit percentage lower than a certain threshold into the first subgroup, UEs with a paging hit percentage that achieves the threshold but is lower than a second threshold in a second subgroup, and so on for higher thresholds of paging hit percentage. In this example, skip configuring component 452 can configure different skip durations for different subgroups of UEs based on paging hit percentage for the subgroups of UEs.

In method 500, at Block 504, the indication of the skip duration can be transmitted. In an aspect, skip configuring component 452, e.g., in conjunction with processor(s) 412, memory/memories 416, transceiver 402, BS communicating component 442, etc., can transmit the indication of the skip duration (e.g., to one or more UEs). For example, skip configuring component 452 can transmit the indication of the skip duration using DCI signaling, as described in further examples herein.

In method 600, at Block 602, an indication of a skip duration of multiple DRX cycles to skip in monitoring for a PEI can be received. In an aspect, occasion skipping component 352, e.g., in conjunction with processor(s) 312, memory/memories 316, transceiver 302, UE communicating component 342, etc., can receive the indication of the skip duration of multiple DRX cycles to skip in monitoring for the PEI. For example, occasion skipping component 352 can receive the indication of the skip duration in DCI signaling, which can be received at a PEIO. Accordingly, in some examples as described herein, PEIO signaling, such as DCI format 2_7 can be used and/or modified to indicate the skip duration for skipping multiple DRX cycles (e.g., including multiple PEIOs).

In one example, in method 500, optionally at Block 506, a list of multiple skip durations that the network node can indicate for skipping can be transmitted. In an aspect, skip configuring component 452, e.g., in conjunction with processor(s) 412, memory/memories 416, transceiver 402, BS communicating component 442, etc., can transmit the list of multiple skip durations (also referred to as a skip duration list) that the network node can indicate for skipping. For example, skip configuring component 452 can configure the list of multiple skip durations using RRC or other signaling, which can allow the network node to indicate one of the skip durations in the list using a smaller number of bits (e.g., using an index in the list instead of the duration value). For example, skip configuring component 452 can configure the RRC list Num_DRX_Cycles_To_Skip_PEI_O_List for transmitting in RRC signaling, such as RRC Release, over-the air (OTA), where the list NumDRXCyclesToSkipPEIO-List information element (IE) in RRC can be SEQUENCE (SIZE (1 . . . 3)) OF PEIO-SkippingDuration. PEIO-SkippingDuration in RRC can be defined as INTEGER (1 . . . 16). In this example, NumDRXCyclesToSkipPEIO-List can be is a list of 3 different values of PEIO-SkippingDuration. PEIO-SkippingDuration can be in terms of number of DRX cycles and can be any value from 1 to 16. As described in examples herein, these value can be used to indicate the skip duration for a UE or group of UEs.

For example, in generating the indication of the skip duration at Block 502, optionally at Block 508, the indication can be generated in a DCI with a bit indicating whether the DCI is for PEI or skipping multiple PEIOs. In an aspect, skip configuring component 452, e.g., in conjunction with processor(s) 412, memory/memories 416, transceiver 402, BS communicating component 442, etc., can generate the indication in the DCI with the bit indicating whether the DCI is for PEI (e.g., as in legacy DCI format 2_7 described above) or for skipping multiple PEIOs. In this regard, DCI format 2_7 can be used and/or modified for indicating skipping multiple PEIOs. An example of a modified DCI format 2_7 is shown below:

| Subgroup ID 0 | PEIO-Skip-Duration-MSB for Subgroup ID 0 PEIO-Skip-Duration-LSB for Subgroup ID 0 | 2 Bits | payloadSizeDCI2-7 bits |
|---|---|---|---|
| Subgroup ID 1 | PEIO-Skip-Duration-MSB for Subgroup ID 1 PEIO-Skip-Duration-LSB for Subgroup ID 1 | 2 Bits | |
| . . . | PEIO-Skip-Duration-MSB for Subgroup ID . . . PEIO-Skip-Duration-LSB for Subgroup ID . . . | 2 Bits | |
| Subgroup ID L - 1 | PEIO-Skip-Duration-MSB for Subgroup ID L - 1 PEIO-Skip-Duration-LSB for Subgroup ID L - 1 | 2 Bits | |
| Reserved | | | |
| PEI-Skip-Indication | | 1 Bit | | where payloadSizeDCI2-7 bits is the size of the DCI format 2_7 (e.g., 41 bits or 43 bits, as described above), the PEIO-Skip-Duration-MSB and PEIO-Skip-Duration-MSB combined can represent an index in Num_DRX_Cycles_To-_Skip_PEI_O_List for determining the skip duration as a number of DRX cycles, and the PEI-Skip-Indication can be the last bit of the DCI format 2_7 payload used to indicate that the DCI format 2_7 is for indicating PEIO skipping. Where the last bit of the DCI format 2_7 is 0, this can indicate the DCI format 2_7 is for PEI (e.g., legacy DCI format 2_7 having the last set of bits as reserved bits, which may be equal to 0).

For example, per DCI format 2_7 payload, PEIO-Skip-Duration can be indicated independently per UE Subgroup. In another example, a PEIO-Skipping-Indication can be indicated in the DCI format 2_7 payload as well. In one example, the PEIO-Skipping-Indication can be implied by the PEIO-Skip-Duration. For example, PEIO-Skip-Duration can imply PEIO-Skipping-Indication of FALSE and any other value can imply PEIO-Skipping-Indication of TRUE. The Last 1 bit of DCI format 2_7 payload can be used to indicate whether a particular DCI format 2_7 payload is for PEIO skipping or legacy PEI indication. When the DCI format 2_7 payload is used to indicate PEIO skipping, there can be two bits per subgroup, in this example where Num-_DRX_Cycles_To_Skip_PEI_O_List can have four elements, to indicate the PEIO-Skipping-Duration for that Subgroup. In one example, PEIO-Skipping-Duration="00" can imply that PEIO skipping does not apply to a particular Subgroup (e.g., PEIO-Skipping-Indication=FALSE), PEIO-Skipping-Duration="01" or "10" or "11" can map to the three other PEIO-SkippingDuration values in Num_DRX-_Cycles_To_Skip_PEI_O_List, which gives the PEIO-Skip-ping-Duration per UE Subgroup (e.g., PEIO-Skipping-Indication=TRUE).

In method 600, optionally at Block 604, a list of multiple skip durations that the network node can indicate for skip-ping can be received. In an aspect, occasion skipping component 352, e.g., in conjunction with processor(s) 312, memory/memories 316, transceiver 302, UE communicating component 342, etc., can receive the list of multiple skip durations that the network node can indicate for skipping. For example, occasion skipping component 352 can receive the list (e.g., Num_DRX_Cycles_To_Skip_PEI_O_List) in RRC signaling, as described above. For example, each element in the list can indicate a number of DRX cycles (and thus PEIOs) to skip, as described.

In this example, in method 600, optionally at Block 606, the indication can be received in DCI with the bit indicating whether the DCI is for PEI or skipping multiple PEIOs. In an aspect, occasion skipping component 352, e.g., in con-junction with processor(s) 312, memory/memories 316, transceiver 302, UE communicating component 342, etc., can receive the indication in the DCI with the bit indicating whether the DCI is for PEI or skipping multiple PEIOs. As described, for example, occasion skipping component 352 can receive DCI format 2_7 from the network node in the PEIO, with the bit indicating that the DCI format 2_7 is for PEIO skipping. As such, the DCI format 2_7 may indicate (e.g., according to the format above) an index into the Num_DRX_Cycles_To_Skip_PEI_O_List of the skip dura-tion for the UE 104 or subgroup of UEs to which UE 104 belongs. Occasion skipping component 352 can process the DCI to determine which set of bits correspond to its UE subgroup, and accordingly which skip duration in Num-_DRX_Cycles_To_Skip_PEI_O_List corresponds to the set of bits.

In one example, skip configuring component 452 can configure the skip duration, and/or occasion skipping com-ponent 352 can skip PEIOs, when the UE is configured in idle or inactive mode. In method 500, optionally at Block 510, an indication to enter idle mode can be transmitted. In an aspect, DRX configuring component 454, e.g., in con-junction with processor(s) 412, memory/memories 416, transceiver 402, BS communicating component 442, etc., can transmit the indication to enter idle mode (e.g., to the UE 104). In one example, the indication to enter idle mode can also indicate, or can be based on a previous configuration that indicates, parameters regarding the DRX cycle. For example, the indication or configuration can indicate a DRX cycle length, a portion of the DRX cycle that is for DRX ON duration or DRX OFF duration, etc. When DRX configuring component 454 configures the idle mode to activate the DRX cycle, skip configuring component 452 can also con-figure PEI or PEIO skipping.

In method 600, optionally at Block 608, an indication to enter idle mode can be received. In an aspect, DRX com-ponent 354, e.g., in conjunction with processor(s) 312, memory/memories 316, transceiver 302, UE communicating component 342, etc., can receive the indication to enter idle mode (e.g., from the network node). DRX component 354 can accordingly activate a configured DRX cycle to enter a reduced power state during DRX OFF durations and tran-sition to an increased or normal power state during DRX ON durations. In an example, occasion skipping component 352 can skip PEIOs based on one or more received configura-tions or indications, as described above, and/or also based on operating in the idle mode. In an example, the network node can send the UE 104 to idle mode to indicate enablement of dynamic PEIO skipping indication feature.

In method 600, at Block 610, a reduced power state can be entered for the skip duration. In an aspect, occasion skipping component 352, e.g., in conjunction with processor (s) 312, memory/memories 316, transceiver 302, UE com-municating component 342, etc., can enter the reduced power state for the skip duration. For example, based on the configured skip duration and/or a skipping indication (which may be implied by the skip duration), as described above, occasion skipping component 352 can enter the reduced power state for a number of DRX cycles indicated by the skip duration. As described, entering the reduced power state can include reducing or terminating power to certain RF components, processors, etc. to conserve energy for the skip duration.

In method 600, at Block 612, an increased power state can be entered after the skip duration to monitor for the PEI, a SSB, or one or more RSs. In an aspect, occasion skipping component 352, e.g., in conjunction with processor(s) 312, memory/memories 316, transceiver 302, UE communicating component 342, etc., can enter the increased power state after the skip duration for the UE communicating component 342 to monitor for the PEI, a SSB, or one or more RSs. For example, after the configured skip duration, as described above, UE communicating component 342 can enter the increased or normal power state for receiving a PEI, SSB, or one or more RSs (e.g., TRS) in a next DRX cycle occurring after the skip duration. For example, UE communicating component 342 can enter the increased or normal power state at the beginning of the DRX cycle and/or at the associated PEIO to monitor for the PEI. As described, entering the increased or normal power state can include increasing power to certain RF components, processors, etc. to monitor for and/or receive wireless communications (e.g., to monitor a physical downlink control channel (PDCCH), physical downlink shared channel (PDSCH) or other channel). An example is shown in FIG. 7.

Figure 7:
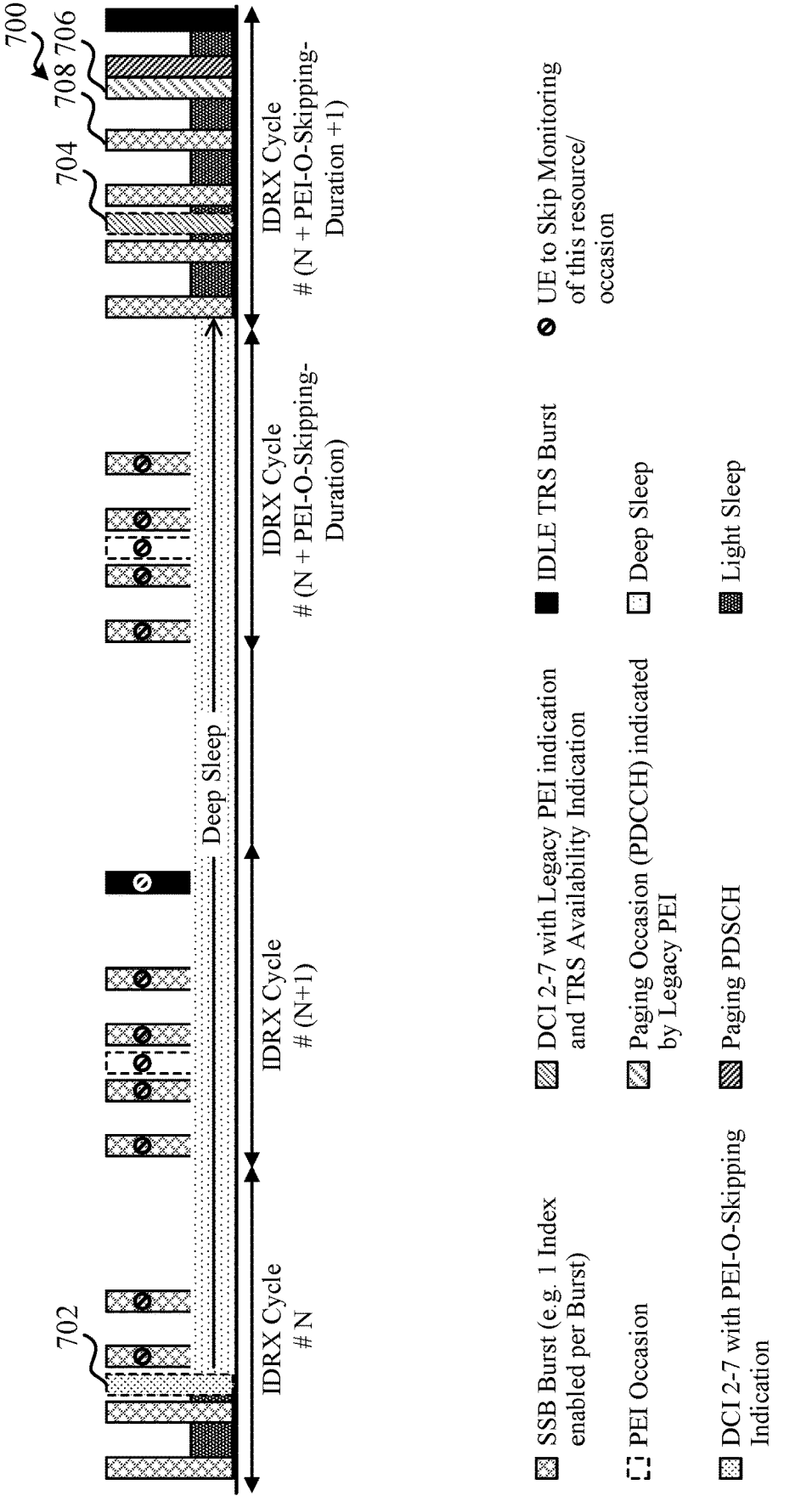
FIG. 7 illustrates an example of a timeline of multiple idle mode discontinuous receive (IDRX) cycles, in accordance with aspects described herein.

FIG. 7 illustrates an example of a timeline 700 of multiple idle mode DRX (IDRX) cycles, in accordance with aspects described herein. Each IDRX cycle can be defined by multiple SSB bursts and a PEIO, as described. TRS bursts can also be transmitted during IDRX cycles. In IDRX cycle #N, a PEI with a PEIO skipping indication can be transmitted by a network node and/or received by a UE at the PEIO at 702. After receiving the PEIO skipping indication, occasion skipping component 352 can enter deep sleep (e.g., the reduced power state) based on the PEIO skipping indication indicated for the UE 104 or for the UE subgroup of the UE 104 (e.g. in DCI format 2_7, as described). For example, occasion skipping component 352 can enter the deep sleep for multiple IDRX cycles, including the remainder of the current IDRX cycle #N to IDRX cycle #(N+skip duration indicated by the PEIO skipping indication). During the deep sleep, occasion skipping component 352 can skip PEIOs and/or tracking/monitoring SSBs as well. In addition, for example, if the UE 104 has received an IDLE-TRS indication, corresponding to which the TRS resource is to be transmitted after the PEIO skipping indication has been received, the UE 104 can refrain from tracking or monitoring that TRS resource as well during deep sleep.

After the skip duration, the UE 104 can transition to an increased or normal power state in a next DRX cycle (e.g., IDRX cycle #(N+skip duration+1)) to monitor a next PEIO 704. For example, occasion skipping component 352 can receive a PEI at the PEIO 704 that includes a legacy PEI and/or TRS availability indication. In an example, occasion skipping component 352 can determine that the PEI indicates legacy PEI based on the last bit of the DCI format 2_7, as described above. In any case, occasion skipping component 352 can determine that the PEI is not for PEIO skipping. In this example, UE communicating component 342 can process the PEI as a legacy PEI to determine which POs to monitor for a paging message, such as PO 706, and DRX component 354 can enter a reduced power state during the other POs for which a paging message is not indicated in the PEI. In one example, the reduced power state for PEI can be different that for PEIO skipping (e.g., a light sleep instead of a deep sleep). For example, during light sleep, the UE can still enter an increased or normal power state to receive SSBs, TRSs, etc. In one example, light sleep may include a different level of reducing power than deep sleep. For example, light sleep may include maintaining power to certain RF or processing components to allow for more efficient wake up to receive the paging message and/or SSBs/TRSs (e.g., SSB 708) during the DRX cycle. In addition, for example, UE communicating component 342 can resume tracking/monitoring SSBs (and/or can resume monitoring IDLE-TRS as per the TRS availability indication indicated by DCI format 2_7 received at 704).

In an example, configuring PEIO skipping can be based on a capability indicated by the UE 104 to support PEIO skipping. In an example, in method 600, optionally at Block 614, a capability indicator indicating support for skipping multiple DRX cycles in monitoring for the PEI can be transmitted. In an aspect, occasion skipping component 352, e.g., in conjunction with processor(s) 312, memory/memories 316, transceiver 302, UE communicating component 342, etc., can transmit the capability indicator indicating the support for skipping multiple DRX cycles in monitoring for the PEI. For example, occasion skipping component 352 can transmit the capability indicator in RRC signaling to a network node.

In method 500, optionally at Block 512, a capability indicator indicating support for skipping multiple DRX cycles in monitoring for the PEI can be received. In an aspect, skip configuring component 452, e.g., in conjunction with processor(s) 412, memory/memories 416, transceiver 402, BS communicating component 442, etc., can receive the capability indicator indicating support for skipping multiple DRX cycles in monitoring for the PEI. For example, skip configuring component 452 can receive the capability indicator from the UE 104 in RRC signaling, and can configure the PEIO skipping (e.g., in generating the indication of the skip duration described in Block 502) based on receiving the capability indicator from the UE. For example, skip configuring component 452 may additionally transmit the list of multiple skip durations (e.g., as described in Block 506) based on receiving the capability indicator from the UE.

Figure 8:
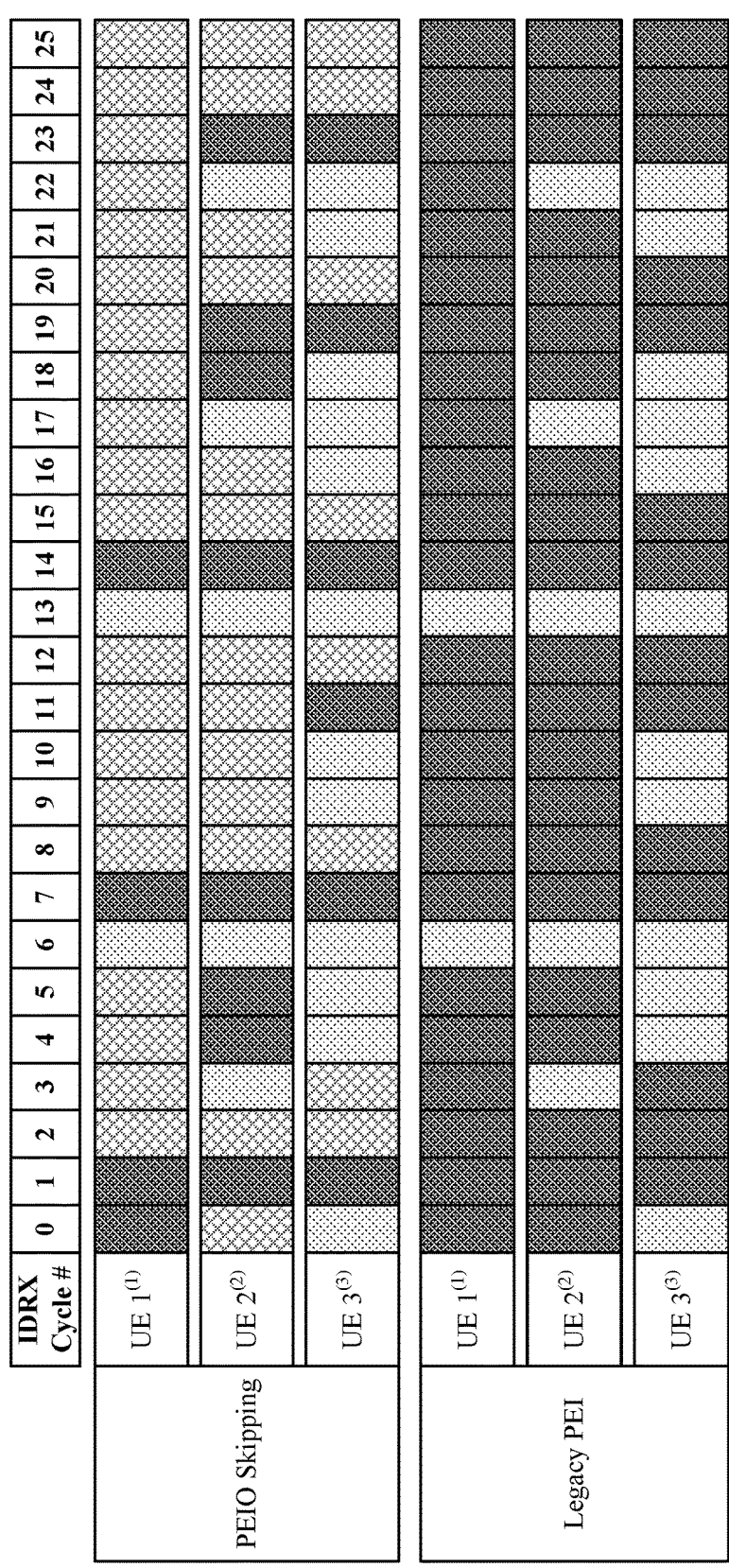
FIG. 8 illustrates an example of a timeline showing difference between PEIO skipping and legacy PEI for UEs based on paging hit percentage, in accordance with aspects described herein.

FIG. 8 illustrates an example of a timeline 800 showing difference between PEIO skipping and legacy PEI for UEs based on paging hit percentage, in accordance with aspects described herein. For example, using PEIO skipping with configured skip durations, as described herein, the network node can assign longer skipping durations to UEs with less paging hit percentage to allow these UEs to enter deep sleep for longer periods of time without having to monitor for PEI (or SSBs or other RSs) during PEIOs. For example, the network node can collect data on paging hit percentage for UEs over a period of time, and can configure PEIO skipping and separate skip duration lists for separate UEs (or UE subgroups) based on the paging hit percentage.

For example, for UE 1 (or UE subgroup 1), which can have a paging hit of less than 10%, in PEIO skipping, the skip duration list can include 4, 5, and 11 DRX cycles, and the network node can accordingly configuring PEIO skipping to include 4, 5, or 11 DRX cycles at a given PEI occasion. As shown, for example, UE 1 can be in a legacy DRX cycle in DRX cycles 0 and 1, and can receive a PEIO skipping indication in the PEI in DRX cycle 1 with a skip duration of 4 DRX cycles (e.g., based on receiving a DCI format 2_7 indicating PEIO skipping and indicating an index in the skip duration list that corresponds to 4 DRX cycles). UE 1 can accordingly enter deep sleep for DRX cycles 2 to 5 (and/or a remainder of DRX cycle 1). At DRX cycle 6, UE 1 can transition to an increased power state, and can receive a PEI. In the next DRX cycle 7, UE 1 can receive a PEIO skipping indication with a skip duration of 5 DRX cycles, and UE 1 can accordingly enter deep sleep for DRX cycles 8 to 12. At DRX cycle 13, UE 1 can transition to an increased power state, and can receive a PEI. In the next DRX cycle 14, UE 1 can receive a PEIO skipping indication with a skip duration of 11 DRX cycles, and UE 1 can accordingly enter deep sleep for DRX cycles 15 to 25, and so on.

UE 2 (or UE subgroup 2), having paging hit percentage between 10% and 25%, can be similarly configured with a skip duration list of 1, 2, and 5 DRX cycles, and UE 3 (or UE subgroup 3), having paging hit percentage between 25% and 50%, can be similarly configured with a skip duration list of 1 or 2 DRX cycles. Comparing with legacy PEI, where the UEs enter light sleep while monitoring for PEI in PEIO, monitoring for SSBs or other RSs, etc., the UEs configured with PEIO skipping can be sent to deep sleep for longer periods of time to conserve power.

Figure 9:
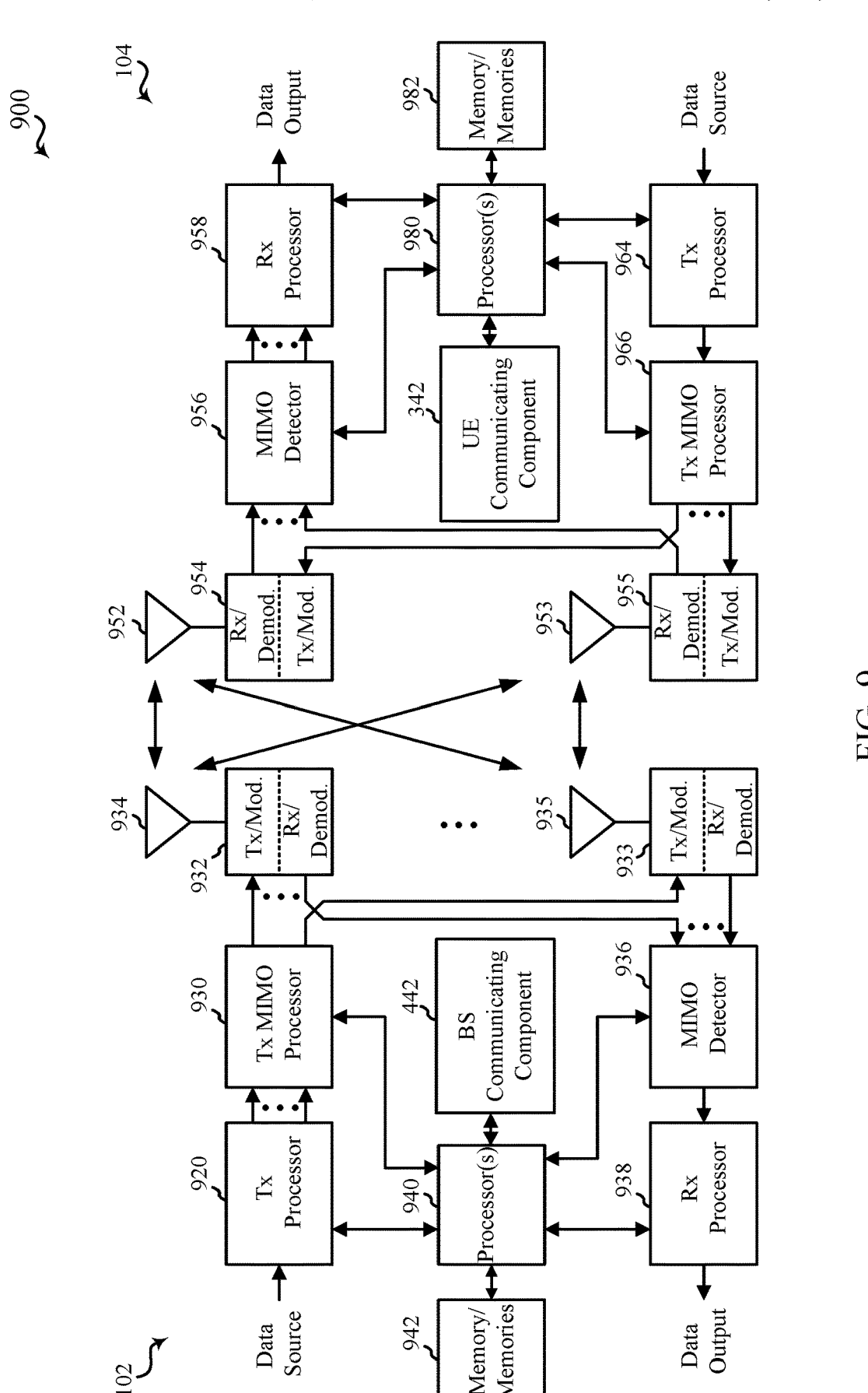
FIG. 9 is a block diagram illustrating an example of a multiple-input multiple-output (MIMO) communication system including a base station and a UE, in accordance with various aspects of the present disclosure.

FIG. 9 is a block diagram of a MIMO communication system 900 including a base station 102 and a UE 104. The MIMO communication system 900 may illustrate aspects of the wireless communication access network 100 described with reference to FIG. 1. The base station 102 may be an example of aspects of the base station 102 described with reference to FIG. 1. The base station 102 may be equipped with antennas 934 and 935, and the UE 104 may be equipped with antennas 952 and 953. In the MIMO communication system 900, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104 may be an example of aspects of the UEs 104 described with reference to FIGS. 1 and 3. At the UE 104, the UE antennas 952 and 953 may receive the DL signals from the base station 102 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104 to a data output, and provide decoded control information to one or more processors 980, or memory/memories 982.

The one or more processors 980 may in some cases execute stored instructions to instantiate a UE communicating component 342 (see e.g., FIGS. 1 and 3).

On the uplink (UL), at the UE 104, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for single carrier-FDMA, etc.), and be transmitted to the base station 102 in accordance with the communication parameters received from the base station 102. At the base station 102, the UL signals from the UE 104 may be received by the antennas 934 and 935, processed by the modulator/demodulators 932 and 933, detected by a MIMO detector 936 if applicable, and further processed by a receive processor 938. The receive processor 938 may provide decoded data to a data output and to the one or more processors 940 or memory/memories 942.

The one or more processors 940 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 900. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 900.

The following aspects are illustrative only and aspects thereof may be combined with aspects of other embodiments or teaching described herein, without limitation.

Aspect 1 is a method for wireless communication at a UE including receiving, from a network node, an indication of a skip duration of multiple DRX cycles to skip in monitoring for a PEI, entering, at the UE, a reduced power state for the skip duration, and entering, at the UE, an increased power state after the skip duration to monitor for the PEI, a SSB, or one or more reference signals.

In Aspect 2, the method of Aspect 1 includes wherein entering the reduced power state is further based on receiving, from the network node, an indication to enter idle mode.

In Aspect 3, the method of any of Aspects 1 or 2 includes receiving, from the network node, a list of multiple skip durations that the network node can indicate for the UE, wherein the skip duration is in the list of multiple skip durations.

In Aspect 4, the method of Aspect 3 includes wherein receiving the indication of the skip duration includes receiving an indication of an index in the list of multiple skip durations that corresponds to the skip duration.

In Aspect 5, the method of any of Aspects 1 to 4 includes wherein receiving the indication of the skip duration includes receiving a DCI format with a bit indicating whether the DCI format indicates PEI or the skip duration for multiple PEI occasions corresponding to the multiple DRX cycles.

In Aspect 6, the method of any of Aspects 1 to 5 includes wherein the indication of the skip duration is per subgroup of UEs.

In Aspect 7, the method of any of Aspects 1 to 6 includes wherein receiving the indication of the skip duration includes receiving a DCI format indicating multiple skip durations each for a different subgroup of UEs.

In Aspect 8, the method of Aspect 7 includes wherein the DCI format indicates at least one subgroup of UEs for which skipping multiple DRX cycles in monitoring for the PEI is not configured.

In Aspect 9, the method of any of Aspects 1 to 8 includes wherein the reduced power state includes refraining from monitoring for the PEI, the SSB, and the one or more reference signals.

In Aspect 10, the method of any of Aspects 1 to 9 includes transmitting, for the network node, a capability indicator indicating support for skipping the multiple DRX cycles in monitoring for the PEI, wherein receiving the indication of the skip duration is based on the capability indicator.

Aspect 11 is a method for wireless communication at a network node including generating, for a UE, an indication of a skip duration of multiple DRX cycles to skip in monitoring for a PEI signal, and transmitting, for the UE, the indication of the skip duration.

In Aspect 12, the method of Aspect 11 includes transmitting, for the UE, an indication to enter idle mode.

In Aspect 13, the method of any of Aspects 11 or 12 includes transmitting, for the UE, a list of multiple skip durations that the network node can indicate for the UE, wherein the skip duration is in the list of multiple skip durations.

In Aspect 14, the method of Aspect 13 includes wherein transmitting the indication of the skip duration includes transmitting an indication of an index in the list of multiple skip durations that corresponds to the skip duration.

In Aspect 15, the method of any of Aspects 11 to 14 includes wherein transmitting the indication of the skip duration includes transmitting a DCI format with a bit indicating whether the DCI format indicates PEI or the skip duration for multiple PEI occasions corresponding to the multiple DRX cycles.

In Aspect 16, the method of any of Aspects 11 to 15 includes wherein the indication of the skip duration is per subgroup of UEs.

In Aspect 17, the method of any of Aspects 11 to 16 includes wherein transmitting the indication of the skip duration includes transmitting a DCI format indicating multiple skip durations each for a different subgroup of UEs.

In Aspect 18, the method of Aspect 17 includes wherein the DCI format indicates at least one subgroup of UEs for which skipping multiple DRX cycles in monitoring for the PEI is not configured.

In Aspect 19, the method of any of Aspects 11 to 18 includes receiving, for the UE, a capability indicator indicating support for skipping the multiple DRX cycles in monitoring for the PEI, wherein transmitting the indication of the skip duration is based on the capability indicator.

Aspect 20 is an apparatus for wireless communication including one or more processors, one or more memories coupled with the one or more processors, and instructions stored in the one or more memories and operable, when executed by the one or more processors, to cause the apparatus to perform any of the methods of Aspects 1 to 19.

Aspect 21 is an apparatus for wireless communication including means for performing any of the methods of Aspects 1 to 19.

Aspect 22 is one or more computer-readable media including code executable by one or more processors for wireless communications, the code including code for performing any of the methods of Aspects 1 to 19.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD- ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
one or more memories configured to, individually or in combination, store instructions; and
one or more processors communicatively coupled with the one or more memories, wherein the one or more processors are, individually or in combination, configured to execute the instructions to cause the apparatus to:
receive, from a network node, an indication of a skip duration of multiple discontinuous receive (DRX) cycles to skip in monitoring for a paging early indication (PEI);
enter a reduced power state for the skip duration; and
enter an increased power state after the skip duration to monitor for the PEI, a synchronization signal block (SSB), or one or more reference signals.

2. The apparatus of claim 1, wherein the one or more processors are, individually or in combination, configured to execute the instructions to cause the apparatus to enter the reduced power state further based on receiving, from the network node, an indication to enter idle mode.

3. The apparatus of claim 1, wherein the one or more processors are, individually or in combination, configured to execute the instructions to cause the apparatus to receive, from the network node, a list of multiple skip durations that the network node can indicate for the apparatus, wherein the skip duration is in the list of multiple skip durations.

4. The apparatus of claim 3, wherein the one or more processors are, individually or in combination, configured to execute the instructions to cause the apparatus to receive the indication of the skip duration as an indication of an index in the list of multiple skip durations that corresponds to the skip duration.

5. The apparatus of claim 1, wherein the one or more processors are, individually or in combination, configured to execute the instructions to cause the apparatus to receive the indication of the skip duration in a downlink control information (DCI) format with a bit indicating whether the DCI format indicates PEI or the skip duration for multiple PEI occasions corresponding to the multiple DRX cycles.

6. The apparatus of claim 1, wherein the indication of the skip duration is per subgroup of UEs.

7. The apparatus of claim 1, wherein the one or more processors are, individually or in combination, configured to execute the instructions to cause the apparatus to receive the indication of the skip duration in a downlink control information (DCI) format indicating multiple skip durations each for a different subgroup of UEs.

8. The apparatus of claim 7, wherein the DCI format indicates at least one subgroup of UEs for which skipping multiple DRX cycles in monitoring for the PEI is not configured.

9. The apparatus of claim 1, wherein the reduced power state includes refraining from monitoring for the PEI, the SSB, and the one or more reference signals.

10. The apparatus of claim 1, wherein the one or more processors are, individually or in combination, configured to execute the instructions to cause the apparatus to transmit, for the network node, a capability indicator indicating support for skipping the multiple DRX cycles in monitoring for the PEI, wherein the one or more processors are, individually or in combination, configured to execute the instructions to cause the apparatus to receive the indication of the skip duration based on the capability indicator.

11. An apparatus for wireless communication, comprising:
a transceiver;
one or more memories configured to, individually or in combination, store instructions; and
one or more processors communicatively coupled with the one or more memories, wherein the one or more processors are, individually or in combination, configured to execute the instructions to cause the apparatus to:
generate, for a user equipment (UE), an indication of a skip duration of multiple discontinuous receive (DRX) cycles to skip in monitoring for a paging early indication (PEI) signal; and
transmit, for the UE, the indication of the skip duration.

12. The apparatus of claim 11, wherein the one or more processors are, individually or in combination, configured to execute the instructions to cause the apparatus to transmit, for the UE, an indication to enter idle mode.

13. The apparatus of claim 11, wherein the one or more processors are, individually or in combination, configured to execute the instructions to cause the apparatus to transmit, for the UE, a list of multiple skip durations that the apparatus can indicate for the UE, wherein the skip duration is in the list of multiple skip durations.

14. The apparatus of claim 13, wherein the one or more processors are, individually or in combination, configured to execute the instructions to cause the apparatus to transmit the indication of the skip duration as an indication of an index in the list of multiple skip durations that corresponds to the skip duration.

15. The apparatus of claim 11, wherein the one or more processors are, individually or in combination, configured to execute the instructions to cause the apparatus to transmit the indication of the skip duration in a downlink control information (DCI) format with a bit indicating whether the DCI format indicates PEI or the skip duration for multiple PEI occasions corresponding to the multiple DRX cycles.

16. The apparatus of claim 11, wherein the indication of the skip duration is per subgroup of UEs.

17. The apparatus of claim 11, wherein the one or more processors are, individually or in combination, configured to execute the instructions to cause the apparatus to transmit the indication of the skip duration in a downlink control information (DCI) format indicating multiple skip durations each for a different subgroup of UEs.

18. The apparatus of claim 17, wherein the DCI format indicates at least one subgroup of UEs for which skipping multiple DRX cycles in monitoring for the PEI is not configured.

19. The apparatus of claim 11, wherein the one or more processors are, individually or in combination, configured to execute the instructions to cause the apparatus to receive, for the UE, a capability indicator indicating support for skipping the multiple DRX cycles in monitoring for the PEI, wherein the one or more processors are, individually or in combination, configured to execute the instructions to cause the apparatus to transmit the indication of the skip duration based on the capability indicator.

20. A method for wireless communication at a user equipment (UE), comprising:

receiving, from a network node, an indication of a skip duration of multiple discontinuous receive (DRX) cycles to skip in monitoring for a paging early indication (PEI);

entering, at the UE, a reduced power state for the skip duration; and entering, at the UE, an increased power state after the skip duration to monitor for the PEI, a synchronization signal block (SSB), or one or more reference signals.

21. The method of claim 20, wherein entering the reduced power state is further based on receiving, from the network node, an indication to enter idle mode.

22. The method of claim 20, further comprising receiving, from the network node, a list of multiple skip durations that the network node can indicate for the UE, wherein the skip duration is in the list of multiple skip durations.

23. The method of claim 22, wherein receiving the indication of the skip duration includes receiving an indication of an index in the list of multiple skip durations that corresponds to the skip duration.

24. The method of claim 20, wherein receiving the indication of the skip duration includes receiving a downlink control information (DCI) format with a bit indicating whether the DCI format indicates PEI or the skip duration for multiple PEI occasions corresponding to the multiple DRX cycles.

25. The method of claim 20, wherein the indication of the skip duration is per subgroup of UEs.

26. The method of claim 20, wherein receiving the indication of the skip duration includes receiving a downlink control information (DCI) format indicating multiple skip durations each for a different subgroup of UEs.

27. The method of claim 26, wherein the DCI format indicates at least one subgroup of UEs for which skipping multiple DRX cycles in monitoring for the PEI is not configured.

28. The method of claim 20, wherein the reduced power state includes refraining from monitoring for the PEI, the SSB, and the one or more reference signals.

29. A method for wireless communication at a network node, comprising:

generating, for a user equipment (UE), an indication of a skip duration of multiple discontinuous receive (DRX) cycles to skip in monitoring for a paging early indication (PEI) signal; and transmitting, for the UE, the indication of the skip duration.

30. The method of claim 29, further comprising transmitting, for the UE, an indication to enter idle mode.

* * * * *